Figures 2, 3, 4:
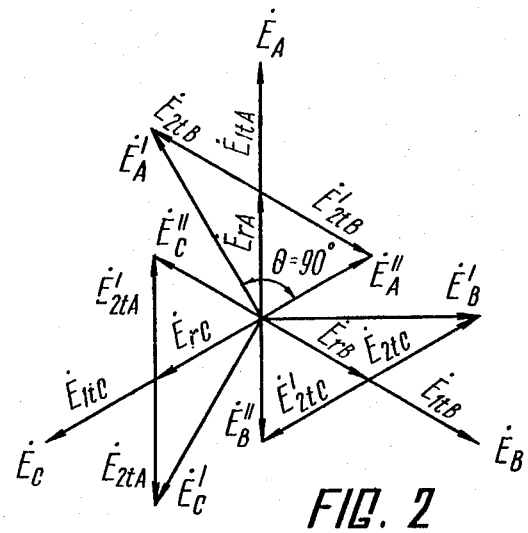

United States Patent [19]

Boshnyaga et al.

[11] 3,975,673

[45] Aug. 17, 1976

[54] PHASE SHIFTER

[76] Inventors: Valery Anatolievich Boshnyaga, 1 Kostjuzhensky pereulok 1; Lev Pavlovich Kalinin, ulitsa Stefana Velikogo 51-a, kv. 35; Vitaly Mikhailovich Postolaty, ulitsa Demokraticheskaya 6/1, kv. 58, all of Kishinev, U.S.S.R.

[22] Filed: July 21, 1975

[21] Appl. No.: 597,890

[30] Foreign Application Priority Data

July 22, 1974  U.S.S.R............................ 2048090
July 22, 1974  U.S.S.R............................ -2048091
July 22, 1974  U.S.S.R............................ 2048089

[52] U.S. Cl. ................................. 323/119; 323/50; 323/86; 323/120
[51] Int. Cl.² ............................................. H02J 3/00
[58] Field of Search .............. 307/17; 323/6, 48, 50, 323/56, 83, 86, 108, 119, 120; 328/155

[56] References Cited

UNITED STATES PATENTS

| 2,421,300 | 5/1947 | Stephens........................ 323/120 X |
| 3,184,675 | 5/1965 | Macklem ......................... 323/86 X |
| 3,610,944 | 10/1971 | Mitsui et al........................... 307/17 |
| 3,611,224 | 10/1971 | Becker............................. 323/56 X |

*Primary Examiner*—A. D. Pellinen
*Attorney, Agent, or Firm*—Haseltine, Lake & Waters

[57] ABSTRACT

A phase shifter comprises a three-phase transformer and a reactor to obtain two three-phase output voltage sets, the phase angle therebetween being set equal to 0°, 120° or 180°. Depending on the load, the proposed phase shifter makes it possible, with its transformer or reactor control windings shorted, to switch over a controlled power transmission system of high power-carrying capacity from operation with a phase angle of 0° to operation with a phase angle of 120° or 180°.

9 Claims, 15 Drawing Figures

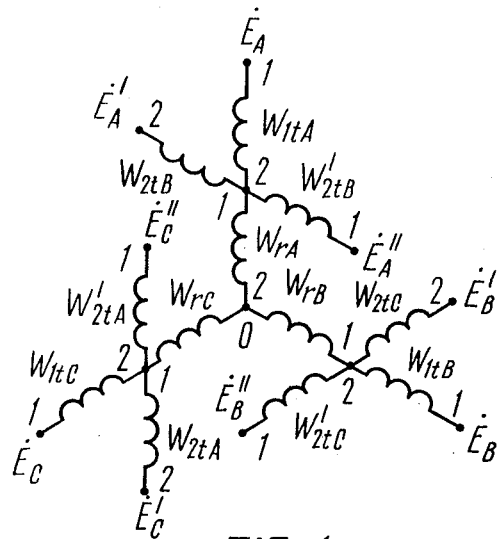
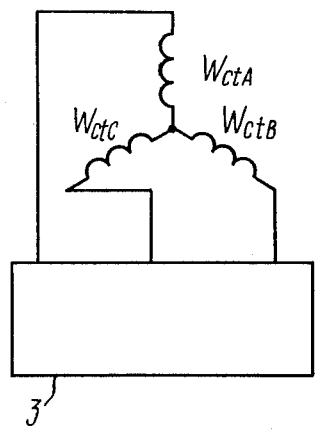
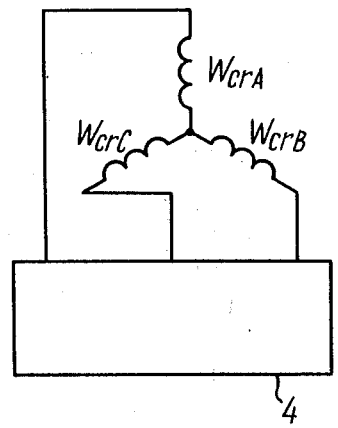
FIG. 1a
FIG. 1b
FIG. 1c

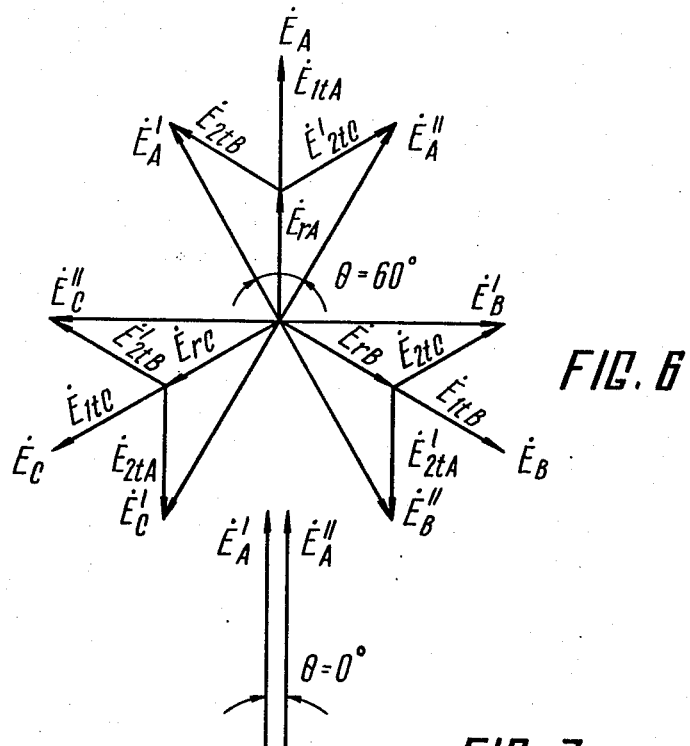
FIG. 6
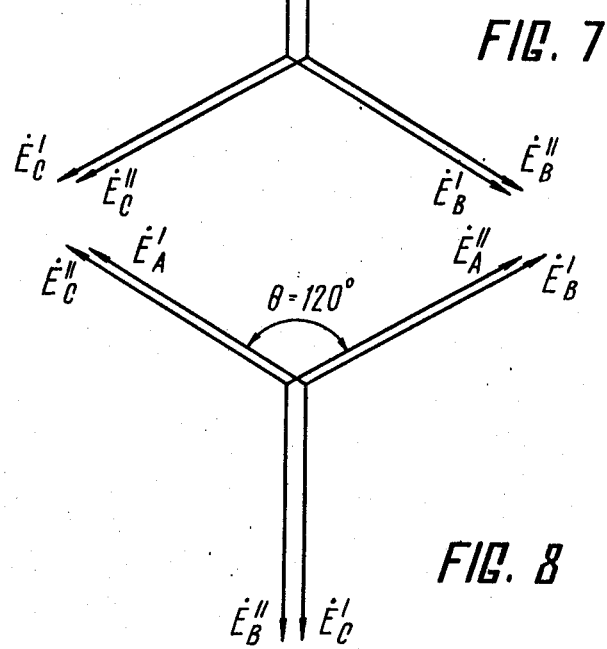
FIG. 7
FIG. 8

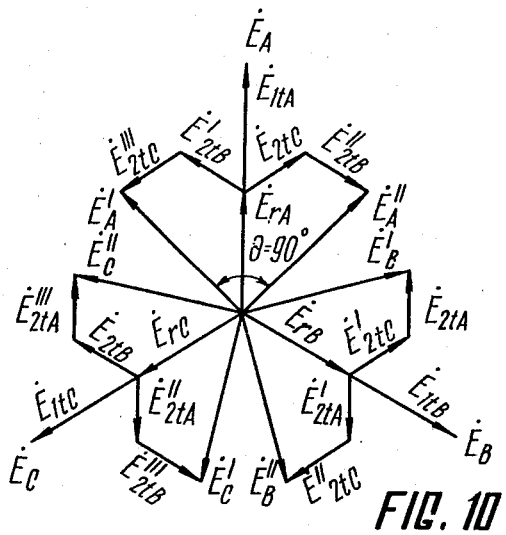
FIG. 10
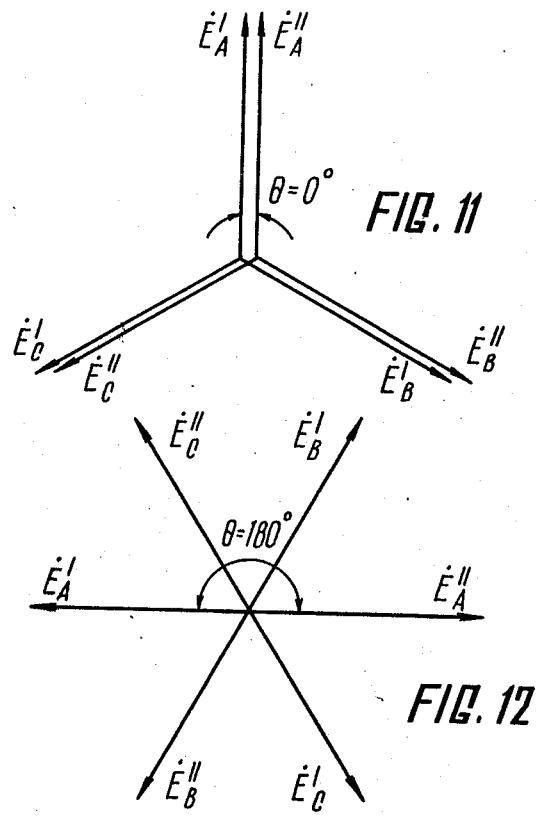
FIG. 11
FIG. 12

PHASE SHIFTER

The present invention relates to transformers, and more particularly to phase shifters.

The invention can most advantageously be used for controlling the operation power transmission systems of high power-carrying capacity.

Power transmission systems normally made up of high power-carrying capacity are of three-phase lines. These lines are spaced as little apart as can be tolerated from the viewpoint of phase-to-phase overvoltage. By adjusting the phase shift or angle between the three-phase voltage sets at the entry to different lines, one can determine the amount and sign of line-to-line electromagnetic influence, hence, set the limit of the power being transmitted. Symmetrical adjustment of the phase shift between the three-phase voltage sets at the entry to different power transmission lines provides for the possibility to change the limit of the power being transmitted within a wide range without affecting the homogeneity of the lines making up a power transmission system of a high power-carrying capacity. The advantages of power transmission systems of high power-carrying capacity can be most fully realized provided they have means for adjusting the phaseshift. The latter can be adjusted continuously or discretely. Continuous adjustment is effective means for making full use of the adjustability of a power transmission system of high power-carrying capacity. However, it complicates the adjusting means, as well as the control system, maintenance and operation. Discrete adjustment, on the other hand, is advantageous in its simplicity, high reliability and speed. It is particularly instrumental in the case of a clearly defined repetitive-peak load curve.

A prior-art phase shifter comprises three transformers whose primary windings are connected to a three-phase network. The primary windings of all the three groups are connected in series to form three primary circuits in a star or delta arrangement. The secondary windings of the three transformers of each group are also connected in series to form three secondary circuits in a star or delta arrangement. The transformers also have two counteractive d-c bias windings, one of these windings providing for magnetic bias while the other series as a control winding. To make for a phase shift of +120°, the bias windings are provided only on two transformers, whereas the control windings are provided on all three.

In the initial state, there is no current through the control winding, while flowing through the magnetic bias winding is direct current saturating the cores of respective transformers. As a result, in each group of primary windings, the supply voltage is applied to the primary winding of the non-saturated transformer. In each group of secondary windings, the voltages across the saturated transformer phases are equal to zero, while the output voltage of each group of secondary windings is equal to the non-saturated transformer secondary voltage, both in phase and in magnitude. In this case, the output voltages of all the three groups of secondary windings form a three-phase set of output voltages. As direct current is fed to the control winding, the transformer operating under conditions of free magnetization (non-saturated transformer) becomes saturated, while one of the saturated transformers becomes non-saturated. The output voltage of each group of secondary windings has its phase drifted through 120°. In the case of reversal of the direct current through the control winding, the phase of the output voltage of each secondary winding group is shifted through −120°.

The above-described prior-art phase shifter fails to provide for symmetric adjustment of the phase angle between two output voltage sets, which is required for the operation of power transmission systems of high power-carrying capacity, and introduces high longitudinal resistance into the load circuit. In addition, the installed power of the phase shifter is three times as high as the maximum load power.

These disadvantages substantially limit the application of the known phase shifter in three-phase voltage sets in power transmission systems of high power-carrying capacity.

It is an object of the present invention to provide a phase shifter capable of regulating the operation of a power transmission system of high power-carrying capacity of symmetrically adjusting the phase shift between two three-phase voltage sets at the entry to the power transmission system lines, the phase shifter having its installed power reduced as well as the resistance introduced into the load circuit.

This object is attained by that in a phase shifter comprising at least one three-phase transformer with primary, secondary and control windings is also provided, according to the invention, with a reactor having power and control windings, the ends of the power windings being connected to a common neutral point, while the beginning of each of said power windings has connected thereto the common point of those secondary windings of the three-phase transformer whose voltage phase is different from that of the reactor power winding, thereby providing for two three-phase output voltage sets, the control windings of the transformer and reactor being connected to respective switching devices which short the control windings, thus making for a phase shift between the three-phase output voltage sets.

It is advisable that the phases of the voltage across two respective secondary windings of the three-phase transformer should coincide and follow the phase of the voltage across a respective power winding of the reactor in a preset phase alternation sequence in the power transmission system.

It is also advisable that the phases of the voltages across two respective secondary windings of the three-phase transformer be different from each other and from the phase of the voltage across a respective power winding of the reactor.

The three-phase transformer should preferably be provided with a third and a fourth secondary windings having their beginnings coupled to the ends of the first two secondary windings.

The number of turns in the primary and secondary windings of the three-phase transformer should preferably be different.

The proposed phase shifter permits with its transformer or reactor control windings shorted, symmetrical shifting of the phase angle between two three-phase output voltage sets applied to different lines of a power transmission system of highpower-carrying capacity.

Figure 13:
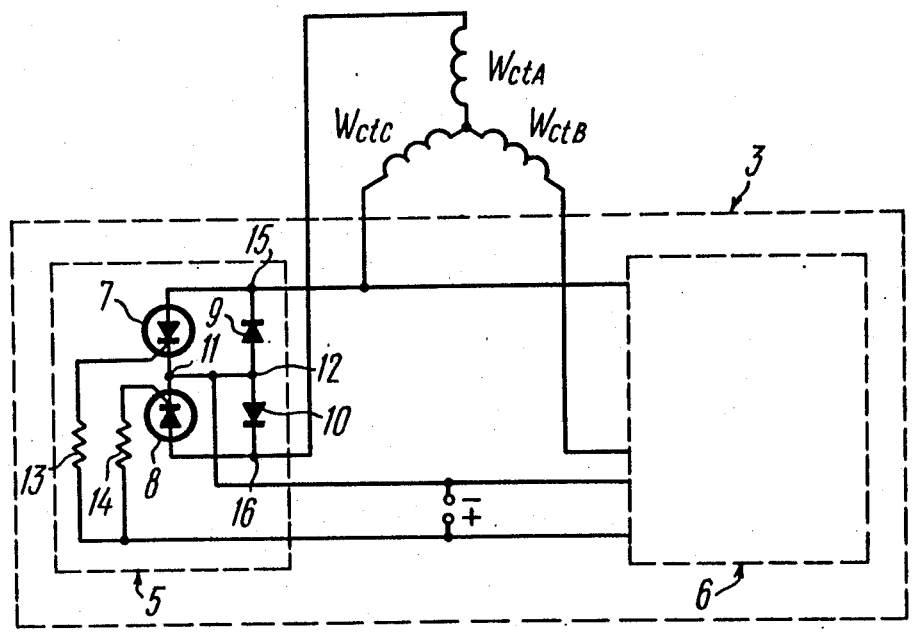

The invention will be more fully understood from the following detailed description of preferred embodiments thereof taken in conjunction with the accompanying drawings, in which:

FIGS. 1a, 1b, 1c, 5 and 9 are electric circuit diagrams of a phase shifter, according to the invention;

FIGS. 2, 3, 4, 6, 7, 8 10, 11, 12 are vector diagrams illustrating the static states of the phase shifter;

FIG. 13 is an electric circuit diagram of the switching devices, showing their connection to the control windings of the three-phase transformer.

The phase shifter in accordance with the present invention comprises a three-phase multiwinding transformer and a reactor, both having control windings $W_{ctA}$, $W_{ctB}$, $W_{ctC}$ and $W_{crA}$, $W_{crB}$, $W_{crC}$. By "reactor" is here meant a device having power windings $W_{rA}$, $W_{rB}$, $W_{rC}$ and control windings $W_{crA}$, $W_{crB}$, $W_{crC}$, all these windings being arranged on a magnet case made from electrical steel, and normally used in electric networks for regulating the reactive power. Referring now to FIGS. 1a, 1b, 1c the power windings $W_{rA}$, $W_{rB}$, $W_{rC}$ of the reactor have their ends 2 connected to a common point O, while connected to the beginnings 1 of the reactor power windings $W_{rA}$, $W_{rB}$, $W_{rC}$ are, respectively, the beginnings 1 of secondary windings $W_{2tB}$, $W_{2tC}$, $W_{2tA}$ of the three-phase transformer and the ends 2 of secondary windings $W_{2tB}'$, $W_{2tA}'$ and primary windings $W_{1tA}$, $W_{1tB}$, $W_{1tC}$, respectively, of the three-phase transformer. The windings $W_{ctA}$, $W_{ctB}$ and $W_{ctC}$ (FIG. 1b) of the transformer phases A, B and C, respectively, are star-connected and coupled to a switching device 3. The control windings $W_{crA}$, $W_{crB}$ and $W_{crC}$ of the reactor are also star-connected and coupled to a switching device 4. FIG. 2 is a vector diagram of the phase shifter output voltages $\dot{E}_A'$, $\dot{E}_B'$, $\dot{E}_C'$ and $\dot{E}_A''$, $\dot{E}_B''$, $\dot{E}_C''$ when the switching devices 3 and 4 (FIGS. 1b and 1c) are in the "off" state. Three-phase sets of output voltages $\dot{E}_A'$, $\dot{E}_B'$, $\dot{E}_C'$ and $\dot{E}_A''$, $\dot{E}_B''$, $\dot{E}_C''$ (FIG. 2) result from geometric addition of the voltages $\dot{E}_{2tA}$, $\dot{E}_{2tA}'$, $\dot{E}_{2tB}$, $\dot{E}_{2tB}'$, $\dot{E}_{2tC}$, $\dot{E}_{2tC}'$ across the secondary windings of the three-phase transformer to the voltages $\dot{E}_{rA}$, $\dot{E}_{rB}$ and $\dot{E}_{rC}$ across the power windings of the reactor, in accordance with the following expressions:

$$\dot{E}'_A = \dot{E}_{rA} + \dot{E}_{2tB} \quad (1)$$
$$\dot{E}'_B = \dot{E}_{rB} + \dot{E}_{2tC} \quad (2)$$
$$\dot{E}'_C = \dot{E}_{rC} + \dot{E}_{2tA} \quad (3)$$
$$\dot{E}''_A = \dot{E}_{rA} + \dot{E}'_{2tB} \quad (4)$$
$$\dot{E}''_B = \dot{E}_{rB} + \dot{E}'_{2tC} \quad (5)$$
$$\dot{E}''_C = \dot{E}_{rC} + \dot{E}'_{2tA} \quad (6)$$

The impedances of the three-phase transformer primary windings $W_{1tA}$, $W_{1tB}$, $W_{1tC}$ (FIG. 1a) and reactor power windings $W_{rA}$, $W_{rB}$, $W_{rC}$ being equal, the supply voltages $\dot{E}_A$, $\dot{E}_B$ and $\dot{E}_C$ are equally distributed among said windings. Then, with the three phase transformer transformation ratio K = 1, the phase angle Θ (FIG. 2) between the three-phase sets of output voltages $E_A'$, $E_B'$, $\dot{E}_C'$ and $\dot{E}_A''$, $\dot{E}_B''$, $\dot{E}_C''$ is equal to 90°. Shown in FIGS. 3 and 4 are vector diagrams of the output voltages in the case of the phase angle Θ being equal to 0° and 180°, respectively.

Figure 5:
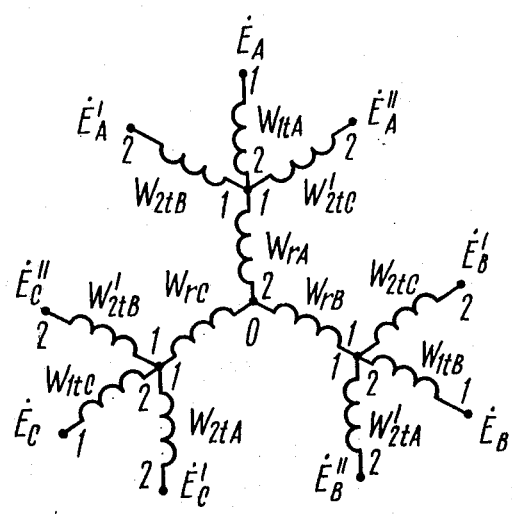

Turning now to FIG. 5, the reactor power windings $W_{rA}$, $W_{rB}$ and $W_{rC}$ have their ends 2 connected to a common point O. Connected to the beginnings 1 of these windings are, respectively, the beginnings 1 of the three-phase transformer secondary windings $W_{2tB}$ and $W_{2tC}'$, $W_{2tC}$ and $W_{2tA}'$, $W_{2tA}$ and $W_{2tB}'$, as well as the ends 2 of its primary windings $W_{1tA}$, $W_{1tB}$ and $W_{1tC}$. The three-phase transformer control windings $W_{ctA}$, $W_{ctB}$, $W_{ctC}$ are star-connected and coupled to a switching device 3 (FIG. 1b). The reactor control windings $W_{crA}$, $W_{crB}$ and $W_{crC}$ are also star-connected and coupled to a switching device 4 (FIG. 1c). FIG. 6 is a vector diagram of the phase shifter output voltages $\dot{E}_A'$, $\dot{E}_B'$, $\dot{E}_C'$ and $\dot{E}_A''$, $\dot{E}_B''$, $\dot{E}_C''$ when the switching devices 3 and 4 (FIGS. 1b and 1c) are in the "off" state. These output voltages (FIG. 6) make up, respectively, two three-phase voltage sets symmetrical with the three-phase set of supply voltages $\dot{E}_A$, $\dot{E}_B$ and $\dot{E}_C$. With the impedances of the three-phase transformer primary windings $W_{1tA}$, $W_{1tB}$, $W_{1tC}$ (FIG. 5) and reactor power windings $W_{rA}$, $W_{rB}$, $W_{rC}$ being equal, the applied voltages $\dot{E}_A$, $\dot{E}_B'$, $\dot{E}_C$ are equally distributed among said windings. The three-phase transformer transformation ratio being equal to unity, the phase angle Θ (FIG. 6) between the three-phase sets of the output voltages $\dot{E}_A'$, $\dot{E}_B'$, $\dot{E}_C'$ and $\dot{E}_B''$, $\dot{E}_C''$ is equal to 60°. Shown in FIGS. 7 and 8 are vector diagrams of these output voltages in the case where the phase angle Θ equals, respectively, 0° and 120°.

Figure 9:
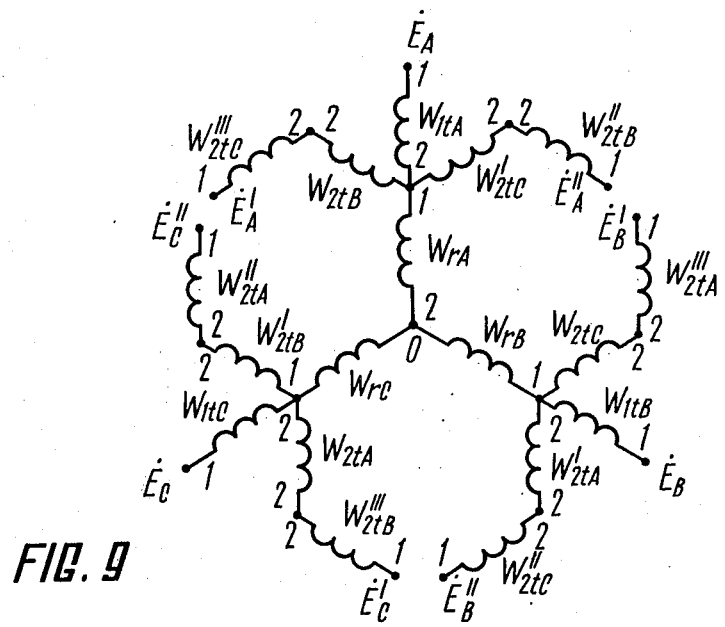

The three-phase transformer in the embodiment shown in FIG. 9 comprises third and fourth secondary windings $W_{2tA}''$ and $W_{2tA}'''$, $W_{2tB}''$ and $W_{2tB}'''$, $W_{2tC}''$ and $W_{2tC}'''$ corresponding to its phases A, B and C, respectively. The reactor windings $W_{rA}$, $W_{rB}$ and $W_{rC}$ have their ends 2 connected to a common point O. Connected to the beginnings 1 of the reactor power windings $W_{rA}$, $W_{rB}$ and $W_{rC}$ are, respectively, the beginnings 1 of the three-phase transformer secondary windings $W_{2tB}$ and $W_{2tC}'$, $W_{2tC}$ and $W_{2tA}'$, $W_{2tA}$ and $W_{2tB}'$, as well as the ends 2 of the three-phase transformer primary windings $W_{1tA}$, $W_{1tB}$, $W_{1tC}$, respectively.

Connected to the ends 2 of the three-phase transformer secondary windings $W_{2tB}$ and $W_{2tC}'$, $W_{2tC}$ and $W_{2tA}'$, $W_{2tA}$ and $W_{wtB}'$ are the ends 2 of the third and fourth secondary windings $W_{2tC}'''$ and $W_{wtB}''$, $W_{wtA}'''$ and $W_{2tC}''$, $W_{2tB}'''$ and $W_{2tA}''$, respectively, of the three-phase transformer phases A, B and C. The three-phase transformer control windings $W_{ctA}$, $W_{ctB}$ and $W_{ctC}$ are star-connected and coupled to a switching device 3, the reactor control windings $W_{crA}$, $W_{crB}$ and $W_{crC}$ also being star-connected and coupled to a switching device 4 (FIGS. 1b and 1c). The vector diagram of FIG. 10 illustrates the phase shifter output voltages $\dot{E}_A'$, $\dot{E}_B'$, $\dot{E}_C'$ and $\dot{E}_A''$, $\dot{E}_B''$, $\dot{E}_C''$ when the switching devices 3 and 4 (FIGS. 1b and 1c) are in the "off" state. The impedances of the three-phase transformer primary windings $W_{1tA}$, $W_{1tB}$, $W_{1tC}$ and reactor power windings $W_{rA}$, $W_{rB}$, and $W_{rC}$ being equal and with the three-phase transformer transformation ratio $K = 1/\sqrt{3}$, the phase angle Θ (FIG. 10) between the three-phase sets of the output voltage $\dot{E}_A'$, $\dot{E}_B'$, $\dot{E}_C'$ and $\dot{E}_A''$, $\dot{E}_B''$, $\dot{E}_C''$ is equal to 90°. FIGS. 11 and 12 represent vector diagrams of the output voltages $\dot{E}_A'$, $\dot{E}_B'$, $\dot{E}_C'$ and $\dot{E}_A''$, $\dot{E}_B''$, $\dot{E}_C''$ for the case where the phase angle equals 0° and 180°. FIG. 13 is an electric circuit diagram of the switching device 3, showing its connection to the three-phase control windings $W_{ctA}$, $W_{ctB}$ and $W_{ctC}$. The circuit arrangement of the switching device 4 and its connection to the reactor control windings $W_{crA}$, $W_{crB}$ and $W_{crC}$ are similar to those of the switching device 3. The switching device 3 includes two full-wave static a-c switches 5 and 6. The full-wave static switch 5 includes thyristors 7 and 8 connected in a series opposing relationship and diodes 9 and 10 connected in a series opposing relationship and in parallel with the thyristors 7 and 8. Points 11 and 12 of connection of the thyristors 7, 8 and diodes 9, 10 are interconnected and coupled to the negative terminal of a control signal source. The control electrodes of the thyristors 7 and 8 are connected to the positive terminal of the control signal source via resistors 13 and 14. The thyristor 7 and diode 9 have their connection point 15 connected to the three-phase transformer control winding $W_{ctC}$, while a connection point 16 of the thyristor 8 and diode 10 is coupled to the control winding $W_{ctA}$ of the three-phase transformer. The circuit arrangement of the full-wave static switch 6 is similar to that of the switch 5. Used as the switching devices 3 and 4 can also be power contact switches.

The herein disclosed phase shifter operates in two modes. The first mode of operation is characterized by the switching device 3 (FIG. 1b) being in the "on" state and the switching device 4 being in the "off" state. As a control signal is applied to the control electrodes of the thyristors 7 and 8 (FIG. 13) of the full-wave static switches 5 and 6, the thyristors 7 and 8 are thrown into conduction. Conducting during the positive half-cycle are the thyristor 7 and diode 10, while conducting during the negative half-cycle are the thyristor 8 and diode 9. Therewith, the three-phase transformer control windings $W_{ctA}$, $W_{ctB}$ and $W_{ctC}$ become shorted. As a result, the applied voltages $\dot{E}_A$, $\dot{E}_B$ and $\dot{E}_C$ (FIGS. 1a, 5 and 9) are redistributed among the three-phase transformer primary windings $W_{1tA}$, $W_{1tB}$, $W_{1tC}$ and reactor power windings $W_{rA}$, $W_{rB}$, $W_{rC}$, the voltage across the primary windings $W_{1tA}$, $W_{1tC}$ of the three-phase transformer being close to zero. In this case, the voltages across all the secondary windings of the three-phase transformator are also close to zero, and the phase angle $\Theta$ (FIGS. 3, 7 and 11) between the three-phase sets of the output voltages $\dot{E}_A'$, $\dot{E}_B'$, $\dot{E}_C'$ and $\dot{E}_A''$, $\dot{E}_B''$, $\dot{E}_C''$ approximates 0°. The vector diagrams of these output voltages for the case under consideration are given in FIGS. 3, 7 and 11. Operation of the proposed phase shifter in the first mode is recommended for no-load conditions or conditions of low load in a controlled line of a power transmission system of high power-carrying capacity.

In the seconds mode of operation, it is the switching device 4 (FIG. 1c) that is in the "on" state, while the switching device 3 is in the "off" state. In this case, similarly as in that described above, the reactor control windings $W_{crA}$, $W_{crB}$ and $W_{crC}$ are shorted. The supply voltages $E_A$, $E_B$ and $E_C$ are practically fully applied to the three-phase transformer primary windings $W_{1tA}$, $W_{1tB}$ and $W_{1tC}$, and the phase angle $\Theta$ (FIGS. 4, 8 and 12) between the three-phase sets of the output voltages $\dot{E}_A'$, $\dot{E}_B'$, $\dot{E}_C'$ and $\dot{E}_A''$, $\dot{E}_B''$, $\dot{E}_C''$ is equal to 120° or 180°. The vector diagrams of these output voltages for the case where the phase angle $\Theta$ equals 120° are represented in FIG. 8, while those for the case where the phase angle equals 180° are given in FIGS. 4 and 12. The second mode of operation of the proposed phase shifter is recommended for high load conditions prevailing in a controlled line of a power transmission system of high power-carrying capacity. The use of a three-phase transformer in the proposed phase shifter has made it possible to substantially reduce the longitudinal resistance introduced into the load circuit.

In some cases, it is expedient not only to change the phase angle $\Theta$ from 0° to 120° or 180°, as the load in a power transmission line of a system with high power-carrying capacity increases, but also to increase the phase shifter output voltages $\dot{E}_A'$, $\dot{E}_B'$, $\dot{E}_C'$ and $\dot{E}_A''$, $\dot{E}_B''$, $\dot{E}_C''$. This is achieved by using a three-phase transformer whose transformation ratio K is greater than unity.

Since under low load conditions the phase angle $\Theta$ is equal to 0° and the supply voltages $\dot{E}_A$, $\dot{E}_B$ and $\dot{E}_C$ are almost fully applied to the reactor, the latter performs the function of a device compensating for an excessive line charging power, as well as acts as a combination of a phase shifter and a compensating reactor in a power transmission line. Therefore, the installed power of the proposed phase shifter is equal to the maximum load capacity.

Thus, the herein disclosed phase shifter makes it possible, depending on the load and with the three-phase transformer control windings $W_{ctA}$, $W_{ctB}$, $W_{ctC}$ and reactor control windings $W_{crA}$, $W_{crB}$, $W_{crC}$ shorted, to switch over a power transmission system of high power-carrying capacity from operation with the phase angle $\Theta$ being equal to 0° to operation with the phase angle $\Theta$ being equal to 120° or 180°.

What is claimed is:

1. A phase shifter comprising: at least one three-phase transformer; primary windings, two secondary windings and control windings of said three-phase transformer; a beginning and an end of each said primary winding of said three-phase transformer; both said secondary windings of said three-phase transformer having a common point; a reactor; power and control windings of said reactor; a beginning and an end of each said power winding of said reactor; said ends of all said power windings of said reactor being connected to a common neutral point; said beginning of each said power winding of said reactor having connected thereto said common point of two respective secondary windings of said three-phase transformer as well as said end of a respective primary winding, thus providing for two three-phase output voltage sets; the phase of the voltages across said two secondary windings of said three-phase transformer differing from that of the voltage across said power winding of said reactor; switching devices for setting the required phase angle between said three-phase output voltage sets; said control windings of said three-phase transformer and reactor being connected to respective switching devices.

2. A phase shifter as claimed in claim 1, wherein the phases of the voltages across two respective secondary windings of said three-phase transformer concide and follow the phase of the voltage across a respective power winding of said reactor in a preset phase alternation sequence in said power transmission system.

3. A phase shifter as claimed in claim 1, wherein the phases of the voltages across two respective windings of said three-phase transformer are different from each other and from the phase of the voltage across a respective power winding of said reactor.

4. A phase shifter as claimed in claim 1, comprising third and fourth secondary windings of said three-phase transformer; a beginning and an end of each said third and fourth winding; said ends of said third and fourth windings being connected to said ends of two said secondary windings.

5. A phase shifter as claimed in claim 3, comprising third and fourth secondary windings of said three-phase transformer; a beginning and an end of each said third and fourth winding; said ends of said third and fourth windings being connected to said ends of two said secondary windings.

6. A phase shifter as claimed in claim 1, wherein the number of turns in said primary and secondary windings of said three-phase transformer is different.

7. A phase shifter as claimed in claim 2, wherein the number of turns in said primary and secondary windings of said three-phase transformer is different.

8. A phase shifter as claimed in claim 3, wherein the number of turns in said primary and secondary windings of said three-phase transformer is different.

9. A phase shifter as claimed in claim 4, wherein the number of turns in said primary and secondary windings of said three-phase transformer is different.

* * * * *